(12) United States Patent
Raad

(10) Patent No.: US 9,947,234 B2
(45) Date of Patent: Apr. 17, 2018

(54) EDUCATIONAL PUZZLE AND WRITING DEVICE

(71) Applicant: Najat J. Raad, Macomb, MI (US)

(72) Inventor: Najat J. Raad, Macomb, MI (US)

( * ) Notice: Subject to any disclaimer, the term of this patent is extended or adjusted under 35 U.S.C. 154(b) by 448 days.

(21) Appl. No.: 14/664,848

(22) Filed: Mar. 21, 2015

(65) Prior Publication Data

US 2015/0269853 A1    Sep. 24, 2015

Related U.S. Application Data

(60) Provisional application No. 61/967,733, filed on Mar. 24, 2014.

(51) Int. Cl.
*G09B 5/00* (2006.01)
*G09B 5/06* (2006.01)
*G09B 11/04* (2006.01)

(52) U.S. Cl.
CPC ............. *G09B 5/06* (2013.01); *G09B 11/04* (2013.01)

(58) Field of Classification Search
USPC ....... 434/130, 156, 159, 162, 163, 164, 169, 434/172, 188, 406; 273/157 R
See application file for complete search history.

(56) References Cited

U.S. PATENT DOCUMENTS

| | | | | |
|---|---|---|---|---|
| 2,454,632 A * | 11/1948 | Cohn | ..................... | G09B 11/04 434/159 |
| 2,612,708 A * | 10/1952 | Amsel | ..................... | A63F 9/10 434/340 |
| 3,280,499 A * | 10/1966 | Studen | ..................... | A63F 9/10 273/156 |
| 3,381,394 A * | 5/1968 | Munro | ..................... | G09B 19/02 434/193 |
| 4,306,868 A * | 12/1981 | Hankins | ..................... | A63F 3/0423 434/159 |
| 4,348,191 A * | 9/1982 | Lipsitz | ..................... | A63F 3/00643 434/259 |
| 4,427,390 A * | 1/1984 | Manger | ..................... | G09B 1/06 273/DIG. 30 |
| 4,609,356 A * | 9/1986 | Gilden | ..................... | A63F 9/0666 434/259 |
| 4,846,692 A * | 7/1989 | Delcambre | ..................... | A63F 9/0093 434/159 |
| 5,074,794 A * | 12/1991 | Von Hagen | ..................... | G09B 1/06 434/159 |
| 5,087,043 A * | 2/1992 | Billings | ..................... | A63F 9/10 273/157 R |
| 5,188,533 A * | 2/1993 | Wood | ..................... | G09B 1/06 434/111 |
| 5,203,706 A * | 4/1993 | Zamir | ..................... | G09B 1/16 434/159 |

(Continued)

*Primary Examiner* — Kurt Fernstrom

(57) ABSTRACT

An educational teaching device for children to learn and write the letters of the alphabet, numbers, or other elements in proper sequence. The device comprises an inner board surface with plurality of cavities and a separate plurality of puzzle pieces of elements corresponding to the configuration. Upon proper placement of puzzle pieces, indicators are activated resulting in the emission of visual or audible signaling. The educational puzzle and writing device also comprises a magnetic writing sheet or writing materials using a magnetic pen or writing implement with numbered arrow instructions.

16 Claims, 6 Drawing Sheets

(56) References Cited

U.S. PATENT DOCUMENTS

| | | | | |
|---|---|---|---|---|
| 5,823,782 A * | 10/1998 | Marcus | ................... | G09B 1/06 |
| | | | | 434/156 |
| 5,931,677 A * | 8/1999 | Rifat | ..................... | G09B 5/062 |
| | | | | 273/237 |
| 5,980,354 A * | 11/1999 | Prest | ..................... | A63H 33/38 |
| | | | | 434/171 |
| 7,350,781 B2 * | 4/2008 | Shalit | ....................... | A63F 3/04 |
| | | | | 273/240 |
| 7,585,216 B2 * | 9/2009 | Foster | ...................... | A63F 9/10 |
| | | | | 463/9 |
| 7,993,139 B2 * | 8/2011 | Lehmann | ................ | G09B 1/30 |
| | | | | 434/160 |
| 9,311,822 B2 * | 4/2016 | Lam | ........................ | G09B 1/06 |
| 9,501,939 B2 * | 11/2016 | Nelson | .................... | G09B 1/08 |
| 2003/0162160 A1 * | 8/2003 | Horchler | .................. | A63F 9/10 |
| | | | | 434/406 |

\* cited by examiner

EDUCATIONAL PUZZLE AND WRITING DEVICE

CROSS-REFERENCE TO RELATED APPLICATIONS

Provisional patent application No. 61/967,733, Filed on Mar. 24, 2014.

FEDERALLY SPONSORED RESEARCH OR DEVELOPMENT

Not Applicable

SEQUENCE LISTING OR PROGRAM

Not Applicable

FIELD OF THE INVENTION

The present invention relates in general to educational learning devices, more particularly, to a multi-functional and self-corrective feedback apparatus to assist handwriting development, enhance recognition, and strengthen listening and spatial skills

BACKGROUND OF THE INVENTION

U.S. Pat. Nos. D699,787S; 1,887,163; 4,353,700; 5,575,658; 4,669,986; 7,350,781 B2; 8,075,982 B2; 6,142,783; to Mahar, Lober, Volakakis, Barnard, Yokohama, Shalit, Donahue, and Rocha, respectively, teach certain of the desired individual concepts, per se, of the present system. However, none of the noted patents address the totality of the multiple functions and the apparatus for performing such functions which are presented in the present combination.

One type of prior art is a known instructional and recreational device disclosed in U.S. Pat. No. 4,306,868 to Hankins entitled: "Multi-function Instructional and Recreational Device". In the Hankins patent, he states, "The instant multi-function instructional and recreational device comprises a podium, having an obliquely inclined bearing surface which selectively mounts and positions a plurality of different writing surfaces and aperture boards for receiving variously shaped fit-in elements. A continuous roll of drawing paper is stretched across the bearing surface for providing a selectively positionable writing surface. The podium is equipped with a storage compartment having suitable recesses for writing implements such a as crayons or the like. It is also equipped with means for storing other operative components. The bearing surface is provided with slots for receiving correspondingly dimensioned tabs on any of a plurality of aperture-equipped game board which can be disposed upon the bearing surface of the podium. In addition to the aperture boards, a blackboard, having a composition surface, may be suitably positioned, by virtue of tabs and slots, on the bearing surface, to provide a surface for writing with chalk or the like."

In consideration of the foregoing, it would be an advancement in the field of language arts to provide an educational teaching aid that is simple, cost effective, reliable, has a minimum part count, minimum hardware, or uses existing and available components for providing additional amusement, education, entertainment, and a better overall user experience. The use of letter shaped puzzle pieces will aid in expanding the child's recognition of correct letter formation. This helps to further develop learning by allowing the opportunity to use the carved letter spaces as a guide for writing the letters of the alphabet. Providing a child with a magnetic sheet and magnetic pen permits the child to develop handwriting skills with the use of numbered guidance arrows located by each letter. In addition, the child will be able to practice their writing by copying what was previously traced. It would also be advantageous if such a puzzle provides reinforcement for attempting to solve the puzzle with curiosity and excitement by adding electrical annunciators for producing audible reinforcement and illumination. Furthermore, it would be an advancement if applying the same or equivalent principles to lower-case alphabet, numbers, and U.S. states map.

SUMMARY OF THE INVENTION

It is, therefore, an aspect of the present invention to provide a multi-functional puzzle and writing device, which permits children to trace letters, numbers, U.S. states map or the like on a magnetic writing sheet or writing material and to allow the writing to be viewed once tracing is complete.

It is a further aspect of the present invention to provide a multi-functional puzzle and writing device, which also permits children to practice their writing by copying what was previously traced using a magnetic pen or writing implement that is provided.

Still another aspect of the present invention is to provide a multi-functional puzzle and writing device, which teaches children how to write using numbered arrows intended for guidance. More specifically, the numbered arrows indicate to the child the first, second, third, fourth and the like written stroke demonstrating the proper way to write the letters and numbers.

Yet another aspect of the present invention is to teach the sequence of the alphabet letters and numbers to the child in their proper chain order.

An additional aspect of the present invention is to permit a child to visualize the position of a particular puzzle piece of a letter, number, U.S. state or the like prior to the insertion of a corresponding part.

A further aspect of the present invention is to improve the teaching of letters, numbers, U.S. states map or the like through visual lighting and audible pronunciations of the letters, numbers, U.S. states map provided upon proper puzzle placement and again upon completion of the puzzle.

To attain the above aspects of the present invention wherein there is provided an improved multi-functional puzzle and writing device, which comprises of an inner board surface having a plurality of cavities therein and defining a respective elements, a plurality of separate puzzle pieces corresponding to the configuration in their proper sequence. The device also comprises an indicator for visual lights and audible pronunciations for each of the element provided upon proper placement. Upon completing the puzzle, the letters or numbers are pronounced in their proper sequence. The multi-functional device also comprises a magnetic writing sheet and magnetic pen allowing children the opportunity to develop and improve their handwriting skills. The provided magnetic pen is to be used for tracing each letter, number, or the like onto the magnet writing sheet with the use of numbered arrows. Furthermore, the child can also view, copy, and practice their tracings. The writing on the magnetic sheet is able to be erased allowing for it to be used repeatedly. The puzzle and writing device includes a handle, a power source, and a secure flap cover to insure that removable parts will stay in place during transit. The multi-functional puzzle and writing device is a great self-corrective apparatus. It is entertaining, easy to use, and attains highly satisfactory learning experiences when used by children.

DRAWINGS

Reference Numerals

| | |
|---|---|
| 21 puzzle and writing kit | 2 on/off switch |
| 4 flap/cover | 32 puzzle piece |
| 18 carrying handle | 40 flashing lights |
| 12 inner surface board | 29 speaker/annunciator |
| 25 cavity/puzzle slots | 75 magnetic pen |
| 63 magnetic writing sheet | 55 numbered guidance arrows |
| 15 rear base | 19 front slot/housing slot |
| 30 batteries/powered source | 70 slide lever |
| 22 conductive pad | 80 indicator |

DETAILED DESCRIPTION OF THE DRAWINGS

Figure 1:
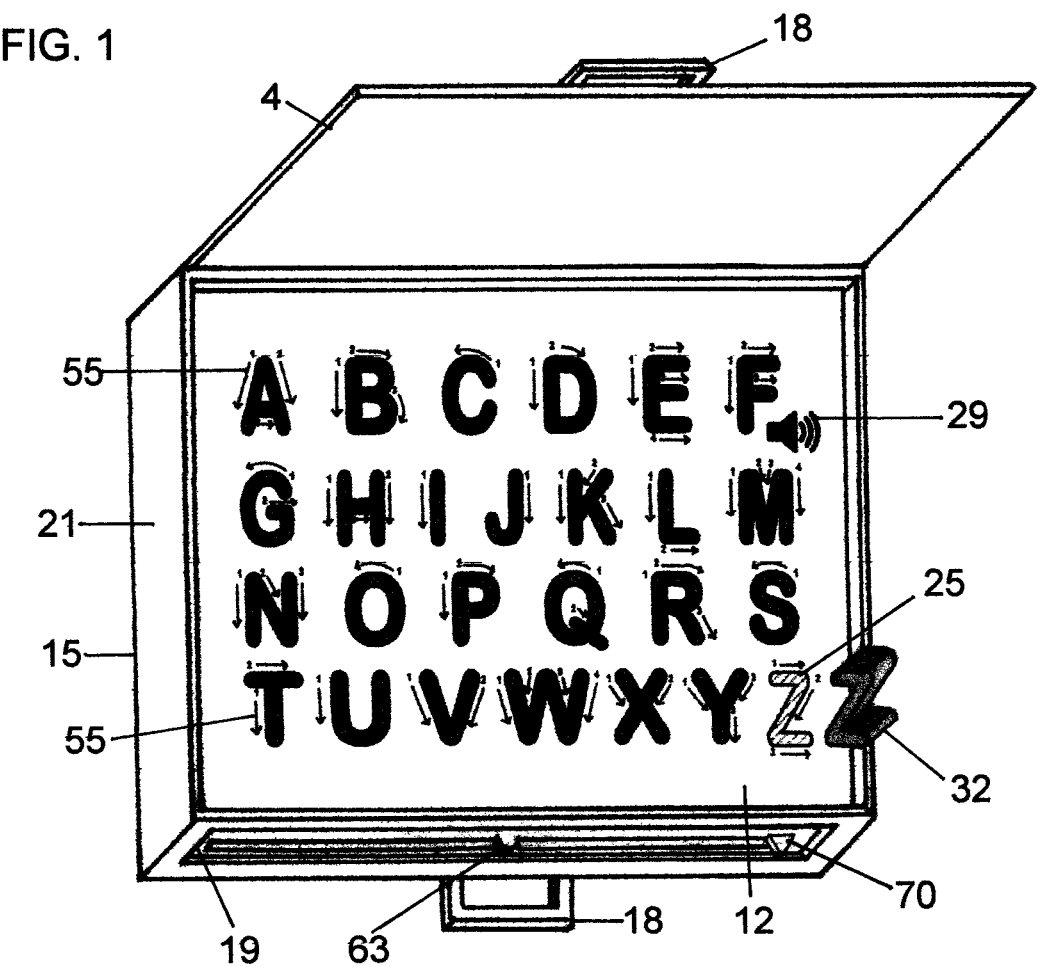
FIG. 1 is a perspective opened front view of the educational puzzle and writing device of the present invention.

Referring to FIG. 1, there is illustrated an embodiment of the educational puzzle and writing device 21 comprising a flap/cover 4 that is connected to the device. Once the flap/cover 4 is opened, an inner board surface 12, which may be rigid or stern or the like, is exposed having plurality of individual puzzle pieces 32 outlining the uppercase letters of the alphabet placed in their corresponding opened cavities 25 in their proper order. Each of the cavities 25 and the corresponding puzzle pieces 32 have the shape of one letter of the alphabet and each puzzle piece 32 may have a different color. As illustrated in FIG. 1, every cavity 25 on the inner surface board 12 are spaced apart from one another to make it easy for a child to view clearly the shape and color of each letter separately. There are 26 individual puzzle pieces 32 that can be stored in their cavities 25 on the inner surface board 12 when device 21 is stowed away. It will be appreciated that the depth of each cavity 25 is slightly less than the thickness of each puzzle piece 32, such that the pieces 32 are easily manipulated in and out of the cavities 25. The educational puzzle and writing device 21 also comprises embossed or printed numbered arrows 55 located around the outline of each cavity 25 on the inner surface board 12 as guidance for tracing. The device 21 also comprises a magnetic writing sheet, paper, or the like 63 that can be inserted into slots located beneath the cavities 25 on any side of the device 21, but preferably into a housing slot 19 located in the front of the device 21 beneath the cavities 25. Furthermore, the housing slot 19 is used for storing the magnetic writing sheet, paper, or the like 63. A magnetic pen or writing implement 75 is a hand-held writing instrument that leaves marking lines on the magnetic writing sheet, paper, or the like 63 when moved in any direction. A slide lever 70 for clearing or erasing marked lines may be attached to the writing sheet 63. Integrating the slide lever 3 into the housing slot 19 is another option of placement of the slide lever 70. A speaker or annunciator 29 for audible reinforcement could be placed anywhere on the inner surface board 12.

Figure 2:
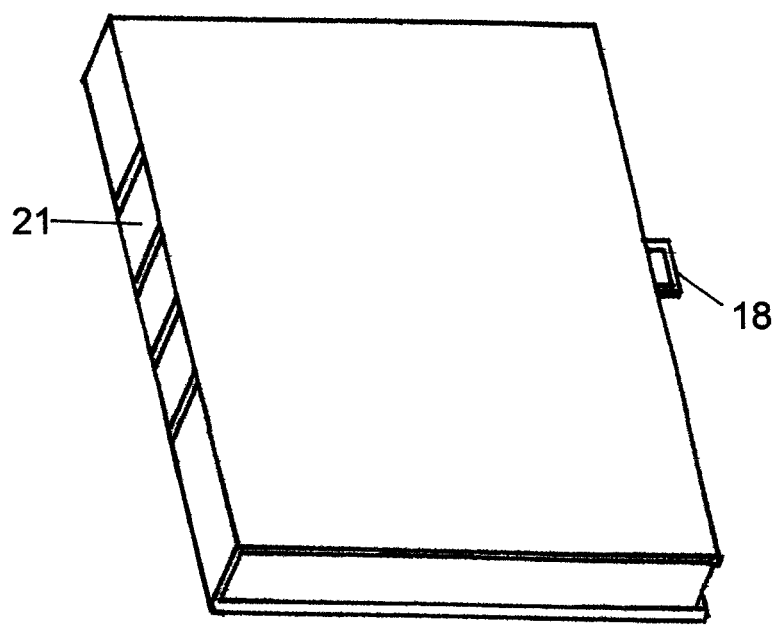
FIG. 2 is a perspective front side view of the invention.

FIG. 2 is a front view of the educational puzzle and writing device 21, which may be constructed to resemble a book, brief case or the like. The size of the device 21 will be suitable for a child to carry without any assistance. The device 21 is formed of molded plastic, metal or the like with at least one or more carry on handles 18. The educational puzzle and writing device 21 is made to be durable and easy to clean.

Figure 3:
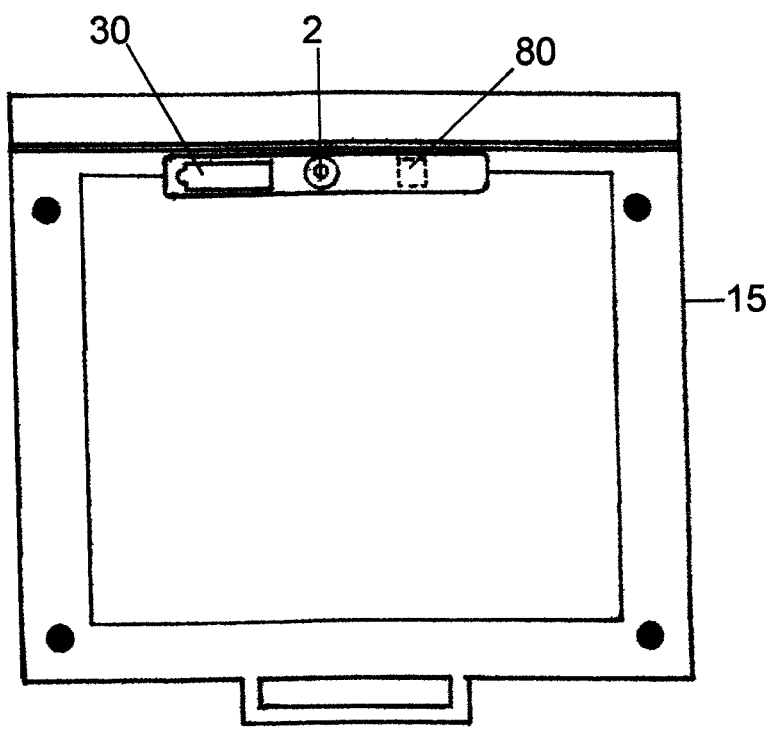
FIG. 3 is a perspective base view of the invention.

FIG. 3 is a rear view of the educational and writing device 21 comprising batteries or power supply 30, an on/off switch or push-button 2, and an indicator 80 located within the base 15.

Figure 4:
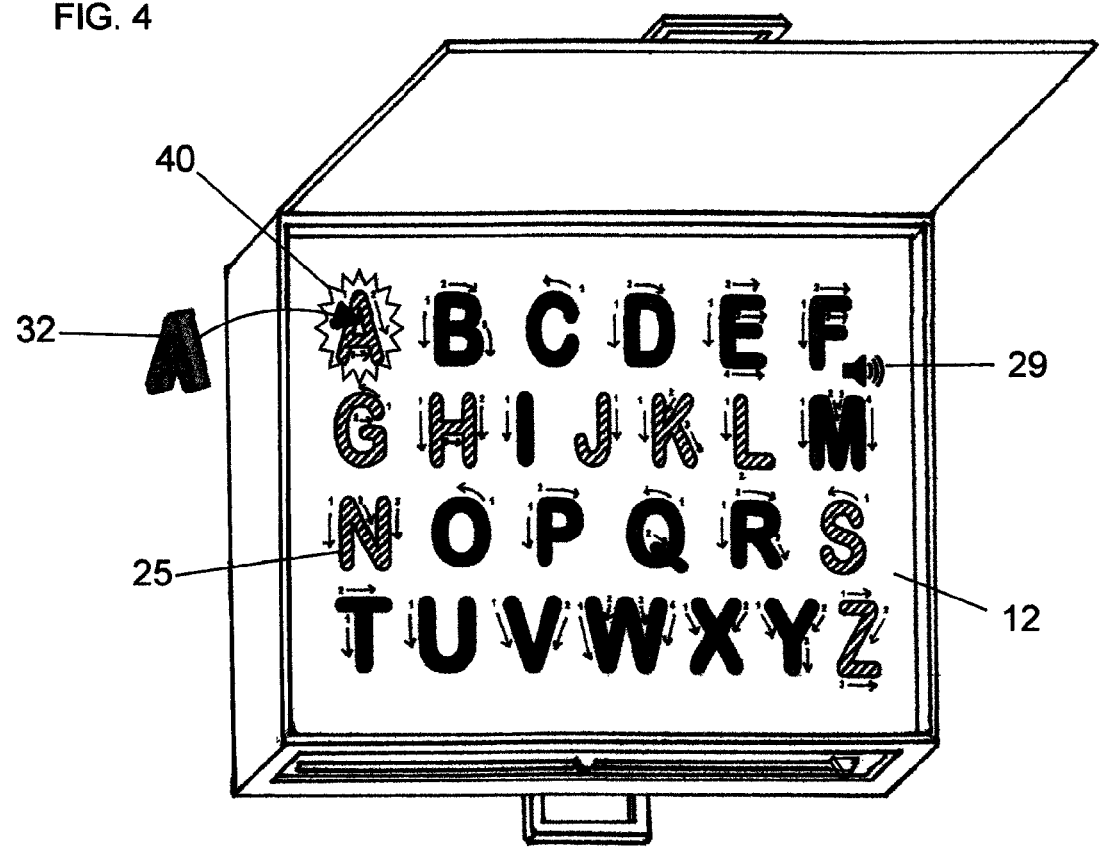
FIG. 4 is a perspective view of the invention illustrating a puzzle piece or letter "A" being inserted into its cavity, activating the visual or audible indicator.
Figure 4:
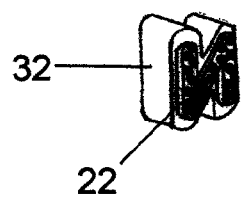
Figure 5:
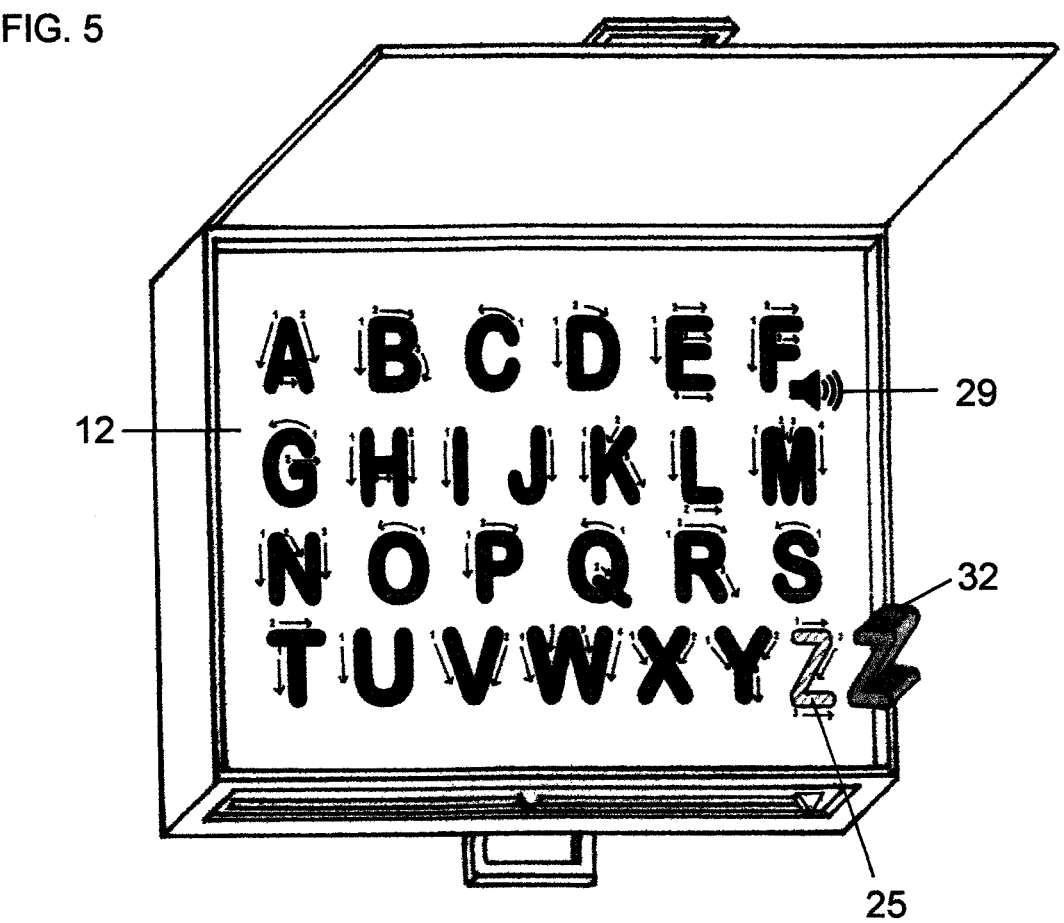
FIG. 5 is a perspective view of the invention illustrating the last puzzle piece or letter "Z" being inserted into its cavity, activating the visual or audible indicator.
Figure 6:
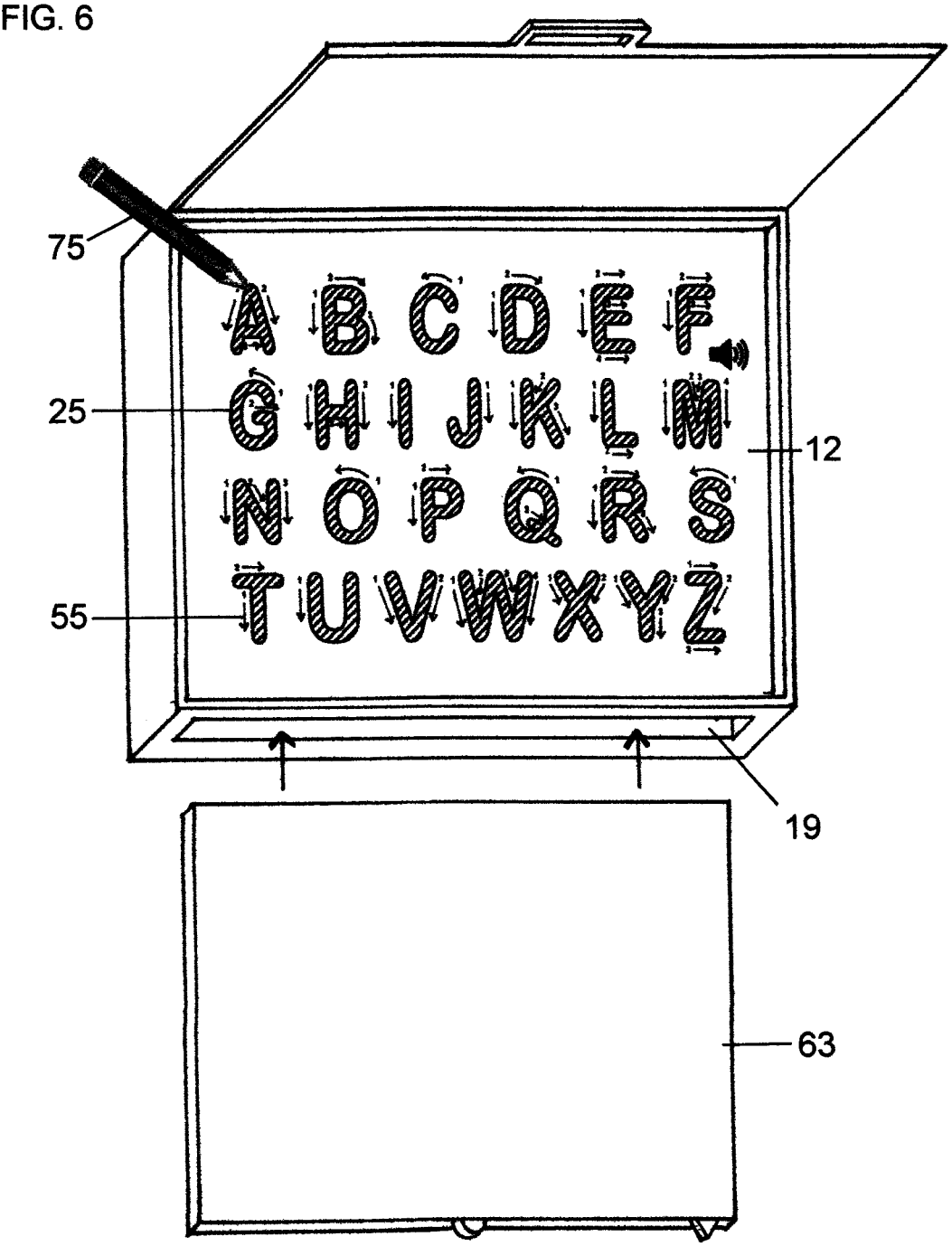
FIG. 6 is a perspective view of the invention illustrating empty cavities with a magnetic writing sheet being inserted into device for training purposes using a magnetic pen.
Figure 7:
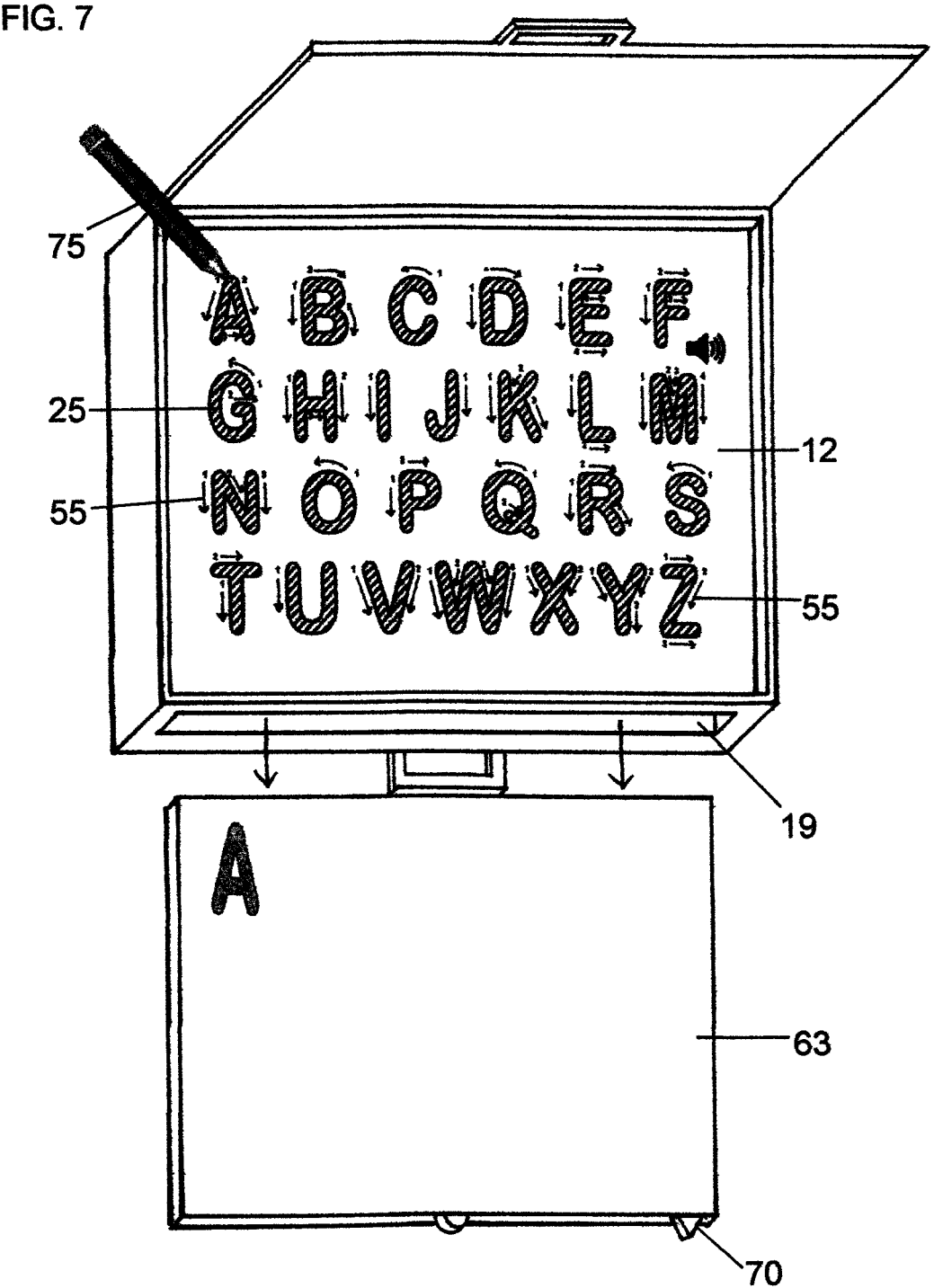
FIG. 7 is a perspective view of the invention illustrating the magnetic writing sheet being removed from device show writing training.

FIGS. 4 and 5 are perspective views of the educational puzzle and writing device 21 showing a puzzle piece 32 being placed into its corresponding cavity 25. Each puzzle piece letter 32 has an attached conductive pad 22, or the like material. Once the puzzle piece 32 is inserted into its correct corresponding cavity 25, the conductive pads 22 complete the circuit within the cavity 25 on the surface board 12 leading to the activation of sensors. Upon activation of sensors, lights are emitted or flashed 40 indicating to the child that the correct letter was inserted properly into its cavity 25. In addition, an annunciator 29 is activated resulting in the pronunciation of the letter. Once all puzzle pieces 32 are placed into their corresponding cavities 25, each letter can be lit up 40 one at a time and each letter will be pronounced 29 in proper sequence. FIGS. 6 and 7 are the front views of the educational puzzle and writing device 21 with the puzzle pieces 32 removed from their corresponding cavities 25. FIG. 6 illustrates the magnetic writing sheet, paper, or the like 63 being inserted into the housing slot 19 of the device 21. Once the writing sheet, paper, or the like 63 is inserted, a magnetic pen or writing implement 75 is used for tracing within the cavity 25 onto the writing sheet, paper, or the like 63. In addition, numbered guidance arrows 55 located by each cavity 25 are included to demonstrate to the child the first, second, third, fourth and the like written stroke. As shown in FIG. 7, the magnetic writing sheet 63 is removed from the housing slot 19 displaying the printed tracings for the child to view. The tracings may be used as a blueprint for the child to continue practicing their handwriting skills by copying what was previously traced. The imprints on the magnetic writing sheet, paper, or the like 63 can be erased with the sliding lever 70 allowing the magnetic writing sheet 63 to be used repeatedly.

The multi-functional educational puzzle and writing device 21 uses entertaining visual and audible rewards to teach children the alphabet, assist handwriting development, enhance recognition, and strengthen listening and spatial skills. In addition, it is within the scope of the invention to provide other configurations while applying the same concept to other elements, such as lower-case letters of the alphabet, numbers, and U.S. states map or the like which are desirable to learn.

While the invention has been described with reference to a particular embodiment, it is to be understood by those skilled in the art that numerous changes may be made without departing from the scope of the invention. Therefore, it is intended that the embodiment disclosed in all respects as illustrative and not restrictive, but that the invention will include all embodiments falling within the scope of the appended claims.

I claim:

1. A multi-functional puzzle and writing device comprising:
   a housing comprising a plurality of sensors, an inner board surface, and a slot beneath said inner board surface, wherein the inner board surface has a plurality of cavities therein representing respective elements, said cavities adapted to receive a separate piece corresponding to said respective elements, each cavity defining a portion of a circuit;
   a plurality of puzzle pieces corresponding to the configuration of said cavities for respective insertion therein, each puzzle piece having an upper surface and a lower surface, said lower surface having a conductive pad, whereby upon placement of each puzzle piece in its correct corresponding cavity, the conductive pad combines with the portion of a circuit of the cavity to form a completed circuit, whereby said sensors indicate correct placement of said puzzle piece by emitting visual and audible signaling; and
   a magnetic sheet configured to be placed within said slot and written on by a user through the cavities when the puzzle pieces are not disposed in the cavities.

2. The multi-functional puzzle and writing device of claim 1, wherein the cavities and puzzle pieces are in the shape of upper case letters of the alphabet.

3. The multi-functional puzzle and writing device of claim 1, wherein the cavities and puzzle pieces are in the shape of lower case letters of the alphabet.

4. The multi-functional puzzle and writing device of claim 1, wherein the cavities and puzzle pieces are in the shape of numbers.

5. The multi-functional puzzle and writing device of claim 1, wherein the cavities and puzzle pieces are in the shape of U.S. states.

6. The multi-functional puzzle and writing device of claim 1, further comprising a magnetic pen configured to leave marking lines on the magnetic sheet.

7. The multi-functional puzzle and writing device of claim 1, wherein the housing further comprises a power supply, an on/off switch, and an indicator.

8. The multi-functional puzzle and writing device of claim 1, wherein the housing further comprises one or more carrying handles.

9. The multi-functional puzzle and writing device of claim 1, wherein each puzzle piece has a different color.

10. The multi-functional puzzle and writing device of claim 1, wherein the depth of each cavity is slightly less than the thickness of each puzzle piece.

11. The multi-functional puzzle and writing device of claim 1, further comprising embossed or printed numbered arrows located around each cavity on the inner surface board as guidance for tracing.

12. The multi-functional puzzle and writing device of claim 1, further comprising a slide lever for clearing or erasing lines marked on the magnetic sheet.

13. The multi-functional puzzle and writing device of claim 1, wherein the visual signaling comprises lights which are emitted or flashed indicating that the correct letter was inserted properly into its cavity.

14. The multi-functional puzzle and writing device of claim 1, wherein the audible signaling comprises a speaker which emits a pronunciation of the element represented by the cavity and puzzle piece.

15. The multi-functional puzzle and writing device of claim 1, wherein the audible signaling comprises a song.

16. The multi-functional puzzle and writing device of claim 1, wherein the audible signaling comprises a syllable, a word, a phrase, a sentence, a short story or a long story.

* * * * *